US008863381B2

(12) United States Patent
Kopchick et al.

(10) Patent No.: US 8,863,381 B2
(45) Date of Patent: Oct. 21, 2014

(54) METHOD OF MAKING A PISTON OIL GALLERY USING A HOLLOW METALLIC CORE

(75) Inventors: Joseph C. Kopchick, Warren, MI (US); Qigui Wang, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 355 days.

(21) Appl. No.: 12/975,529

(22) Filed: Dec. 22, 2010

(65) Prior Publication Data

US 2012/0160092 A1 Jun. 28, 2012

(51) Int. Cl.

*B22D 19/00* (2006.01)
*B23P 15/10* (2006.01)
*F02F 3/22* (2006.01)

(52) U.S. Cl.

CPC .............. *F02F 3/22* (2013.01); *B22D 19/0072* (2013.01)
USPC ................. 29/888.047; 29/888.045; 164/128; 92/186

(58) Field of Classification Search

USPC ......... 29/888.045, 888.047, 888.04, 888.042, 29/888.044; 164/122, 126, 128; 92/186
See application file for complete search history.

(56) References Cited

U.S. PATENT DOCUMENTS 3,533,329 A * 10/1970 Galli ................................ 92/222
4,667,727 A * 5/1987 Barlow et al. .................... 164/97
5,771,776 A * 6/1998 Itoh ................................ 92/186
6,499,386 B2 * 12/2002 Martin et al. .................... 92/186
2008/0202644 A1 * 8/2008 Grassi et al. .................. 148/538
2011/0192359 A1 * 8/2011 Kim ........................... 123/41.35

FOREIGN PATENT DOCUMENTS

IE 912728 A1 * 2/1992 ............. B22D 19/00
JP 10184450 A * 7/1998 ................ F02F 3/22

OTHER PUBLICATIONS

Machine translation of JP 10184450 A.*

* cited by examiner

*Primary Examiner* — Alexander P Taousakis
*Assistant Examiner* — Matthew P Travers
(74) *Attorney, Agent, or Firm* — Dinsmore & Shohl LLP

(57) ABSTRACT

A method of making an aluminum piston is described. In one embodiment, the method includes placing a oil gallery core in a mold, the oil gallery core comprising a metal tube connected to a hollow inlet tube and a hollow outlet tube; introducing liquid aluminum into the mold around the oil gallery core; and allowing the liquid aluminum to solidify, the oil gallery core forming a channel in the piston. Aluminum pistons are also described.

20 Claims, 3 Drawing Sheets

METHOD OF MAKING A PISTON OIL GALLERY USING A HOLLOW METALLIC CORE

BACKGROUND TO THE INVENTION

The invention relates to methods of manufacturing heavy-duty cast aluminum pistons and more particularly, to methods of making an oil gallery passage in the piston.

The current trend in the automobile industry is towards increasing the power density of the engine, reducing emissions, and making lighter engines. These requirements lead to a higher thermal load on the engine, especially on the pistons. As a result, the engine and especially the pistons experience high temperature. Control of piston temperatures has become one of the determining factors in a successful engine design. Any excessive piston temperature rise may lead to engine seizure because of piston warping. If the temperature at the underside of the piston, where the oil jet strikes the piston, is above the boiling range of the oil being used, it may contribute to the generation of mist. This mist contributes significantly to the non-tailpipe emissions in the form of unburnt hydrocarbons (UBHCs).

The pistons are typically cooled by oil jets fired at the underside from the crankcase. In recent years, an oil gallery has been designed in the top portion of the piston so that engine oil can get into the piston to cool it. FIG. 1 shows an example of oil gallery hole 10 cast in a piston 15. The oil gallery hole 10 in a piston 15 is typically created using a dissolvable salt core 20, as shown in FIG. 2. The salt core 20 is dissolved by flushing high pressure water into the passage after casting. To hold the ring-like salt core 20 in place during casting, two metal pins 25 are usually used. The metal pins 25 also form the oil inlet and outlet connecting to the oil gallery passage.

There are several difficulties associated with the use of salt cores. One is the coarse microstructure formed around the oil gallery area because of the low heat transfer coefficient and the heat absoprtion of salt cores. The coarse microstructure may degrade the material properties of the piston. Another issue is that salt cores must be stored in air-tight containers to prevent moisture absorption, which could result in porosity within the piston during casting. In addition, salt cores have a limited useful lifetime. There are additional issues related to the manufacturing process. The ring-like salt core needs to be held in place precisely during casting and, the salt core must be dissolved completely after casting.

SUMMARY OF THE INVENTION

One aspect of the invention relates to a method of making an aluminum piston. In one embodiment, the method includes placing a oil gallery core in a mold, the oil gallery core comprising a metal tube connected to a hollow inlet tube and a hollow outlet tube; introducing liquid aluminum into the mold around the oil gallery core; and allowing the liquid aluminum to solidify, the oil gallery core forming a channel in the piston.

Another aspect of the invention relates to aluminum piston. In one embodiment, the aluminum piston includes an oil gallery core comprising a metal tube connected to a hollow inlet tube and a hollow outlet tube, the metal tube having a circular or elliptical shape.

BRIEF DESCRIPTION OF THE INVENTION

Figure 4A:
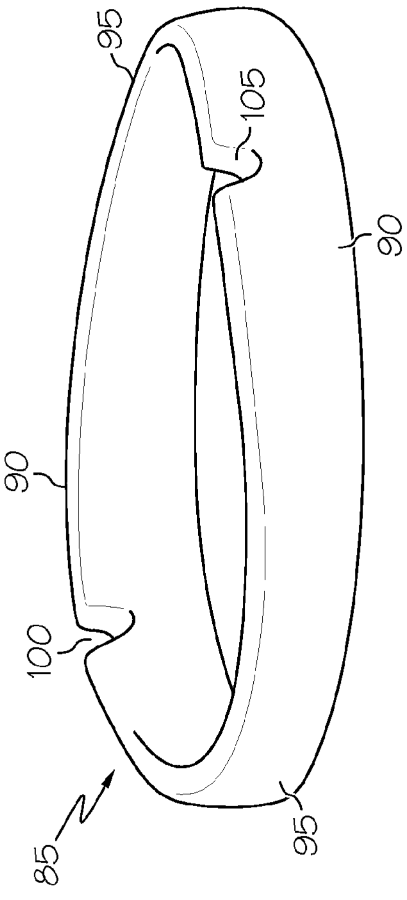
FIG. 4A is an illustration of one embodiment of the metal tube of an oil gallery core.
Figure 4C:
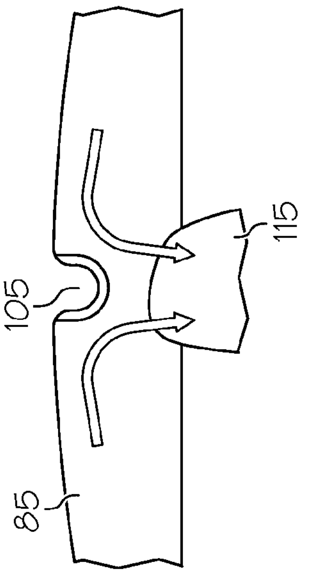
Figure 4B:
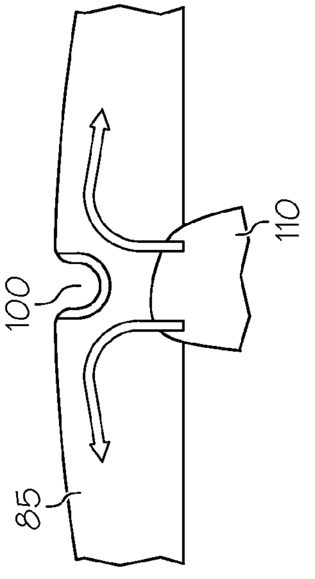

FIGS. 4B-C are illustrations of one embodiment of the connection between the metal tube of FIG. 4A and the inlet and outlet tubes for the oil gallery core.

DETAILED DESCRIPTION OF THE INVENTION

In contrast to the salt ring used in the prior art, the present invention uses a metal tube to form the oil gallery hole. This helps to achieve faster solidification around the oil gallery during casting. In some embodiments, the use of certain types of metal tubes may also help to enhance thermal conductivity during engine operation.

The basic method involves placing the oil gallery core in the piston mold, introducing the liquid aluminum into the mold around the metal tube, and allowing the liquid aluminum to solidify. The piston can then be removed from the mold. The metal tube is attached to hollow metal inlet and outlet tubes, and forms a channel in the piston for oil to flow through during operation of the engine. Typically, the inlet and outlet tubes are perpendicular to the plane of the metal tube.

The metals used for the metal tube and inlet and outlet tubes should have a melting temperature above about 600 C. and high thermal conductivity (e.g., a thermal conductivity about equal to or higher than the thermal conductivity of aluminum. Examples of suitable materials include, but are not limited to, aluminum, copper, and bimetallic tubes, for example, aluminum outside and copper inside.

Using a metal tube allows water to be pumped through the gallery as the piston base metal is solidifying, helping to refine the microstructure in the vicinity of the top ring groove. In addition, if a bimetallic tube is used in which the inner wall of the gallery is copper for example, the heat transfer from the piston to the oil that flows through the gallery during engine operation should be improved.

The metal tube of the oil gallery core can be made by joining the ends of the cylindrical metal tube together to form a circle or an ellipse, for example. Alternatively, the metal tube can be hydro formed to a specific shape. Hydroforming allows the metal tube to have a non-uniform cross-section.

Any suitable piston casting process can be used. Suitable piston casting processes include, but are not limited to, sand casting, permanent mold casting, low pressure die casting, high pressure die casting, squeeze casting, and the like.

One embodiment of the method involves attaching the metal tube of the oil gallery metal core to hollow metal tubes connected to a water pumping system, placing the metal insert in the piston mold or die, closing the mold or die set, pumping water through the oil gallery core during and/or after introduction of the liquid aluminum into the piston mold or die, and/or continuing to pump water while the piston solidifies.

One preferred casting process involves introducing the liquid metal quiescently into the mold or die (so that there is little or no turbulence resulting in less oxidation), and then applying high pressure (e.g., about 8,000 to about 12,000 psi) to the liquid metal in the mold or die after mold filling and until the piston solidifies. Pressure can be applied by increasing the hydrostatic pressure that drives the plunger in the shot sleeve, for example.

Figure 2:
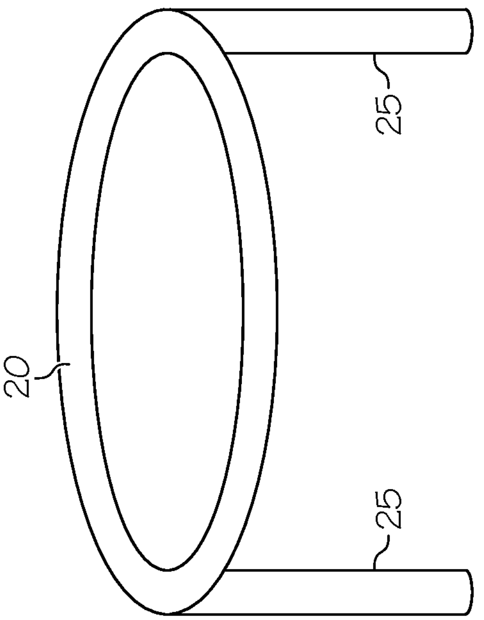
FIG. 2 (PRIOR ART)
FIG. 2 is an illustration of a salt core and metal pins used in the prior art.
Figure 1:
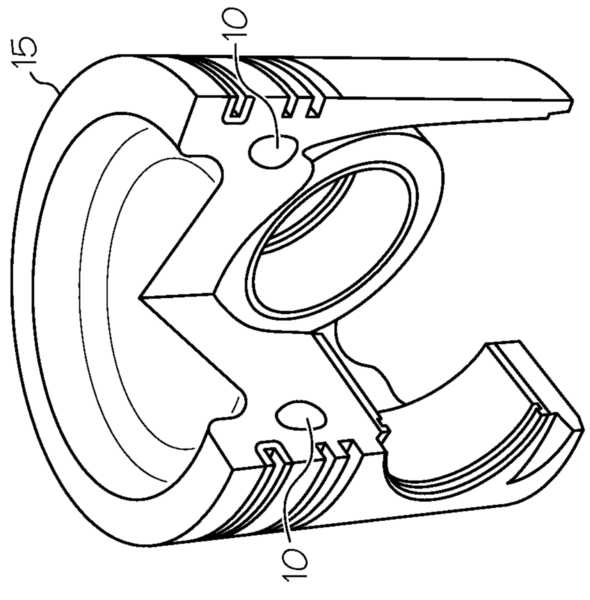
FIG. 1 (PRIOR ART)
FIG. 1 is an illustration of a piston having an oil gallery passage.
Figure 3:
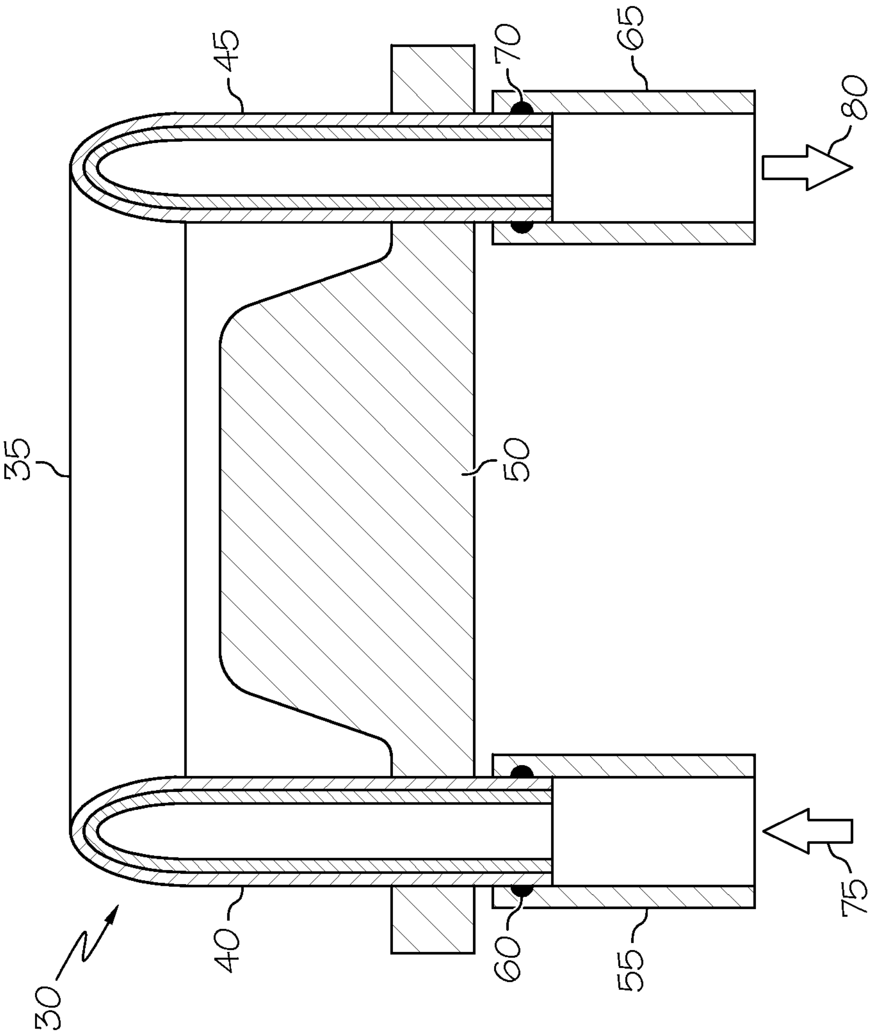
FIG. 3 is an cross-section of one embodiment of an oil gallery core.

FIG. 3 illustrates one embodiment of an oil gallery core 30. The oil gallery core 30 includes a metal tube 35. Inlet tube 40 and outlet tube 45 are connected to the metal tube 35. The oil gallery core is placed in the mold 50. There can be an inlet adapter 55 connected to the inlet tube 40 with a seal 60, and an outlet adapter 65 connected to the outlet tube 45 with a seal 70. Water can be supplied through the water inlet 75 during solidification of the liquid metal. The water flows through the inlet tube adapter 55, inlet tube 40, metal tube 35, outlet tube 45, outlet tube adapter 65 and out through the water outlet 80. This water flow helps to cool the liquid metal and improving the microstructure of the aluminum around the oil gallery core.

FIG. 4A is an illustration of one embodiment of the metal tube 85 of an oil gallery core. The metal tube 85 has a variable cross-section in which the metal tube has a bigger diameter 90 where the inlet tube and outlet tube are connected, and a smaller diameter 95 between the connections. There can optionally be deflectors 100, 105 at the connections to the inlet tubes and outlet tube, if desired. The deflectors 100, 105 can help to distribute the water or oil into the two halves of the metal tube more evenly. The deflectors can be a part of the metal tube wall as shown, or they can be attached to the inside of the wall. The deflector can be any shape that will help to distribute the flow more evenly. FIGS. 4B-C illustrate the water or oil flow at the deflectors. As water or oil flows into the metal tube 85 from the inlet tube 110, the deflector 100 causes the water or oil to split into two streams to flow around the metal tube 85 in both directions. When the water or oil reaches the opposite side of the metal tube 85, the deflector 105 causes the two water or oil streams to flow back together and out through the outlet tube 115.

It is noted that terms like “preferably,” “commonly,” and “typically” are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term “device” is utilized herein to represent a combination of components and individual components, regardless of whether the components are combined with other components. For example, a “device” according to the present invention may comprise an electrochemical conversion assembly or fuel cell, a vehicle incorporating an electrochemical conversion assembly according to the present invention, etc.

For the purposes of describing and defining the present invention it is noted that the term “substantially” is utilized herein to represent the inherent degree of uncertainty that may be attributed to any quantitative comparison, value, measurement, or other representation. The term “substantially” is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making an aluminum piston without the use of a dissolvable salt core, the method comprising:
- placing an oil gallery core in a mold;
- introducing liquid aluminum into the mold around the oil gallery core such that no dissolvable salt core is present in the mold;
- connecting the inlet tube to a supply of water; and
- allowing the liquid aluminum to solidify, the oil gallery core forming a channel in the piston, wherein:
- the oil gallery core comprises a metal tube connected to a hollow inlet tube and a hollow outlet tube;
- the metal tube comprises a variable cross-section along substantially the entire length of the metal tube such that the metal tube has a relatively larger diameter where the inlet tube and outlet tube are connected, and a relatively smaller diameter between where the inlet tube and outlet tube are connected to the metal tube; and
- the inlet tube and the outlet tube are connected to the supply of water and a water outlet respectively with adaptors, each adaptor having a seal formed between the adaptor and the inlet tube or outlet tube.

2. The method of claim 1 further comprising pumping water through the oil gallery core while the liquid aluminum is solidifying.

3. The method of claim 1 further comprising pumping water through the oil gallery core while the liquid aluminum is introduced into the mold.

4. The method of claim 1 wherein the liquid aluminum is introduced quiescently into the mold.

5. The method of claim 1 further comprising applying high pressure to the liquid aluminum in the mold after filling the mold with the liquid aluminum.

6. The method of claim 5 wherein the high pressure is applied until the liquid aluminum is solidified.

7. The method of claim 1 wherein the metal tube is made of aluminum or copper.

8. The method of claim 1 wherein the metal tube is made of a two layer structure.

9. The method of claim 8 wherein the two layer structure comprises an aluminum outer layer and a copper inner layer.

10. The method of claim 1 wherein the metal tube further comprises a deflector where the inlet tube and outlet tube are connected.

11. A method of making an aluminum piston without the use of a dissolvable salt core, the method comprising:
- placing an oil gallery core in a mold;
- connecting the inlet tube to a supply of water;
- introducing liquid aluminum into the mold around the oil gallery core;
- allowing the liquid aluminum to solidify; and
- pumping water through the oil gallery core while the liquid aluminum is solidifying, the oil gallery core forming a channel in the piston, wherein:
- the oil gallery core comprises a metal tube connected to a hollow inlet tube and a hollow outlet tube;
- the metal tube comprises a variable cross-section along substantially the entire length of the metal tube such that the metal tube has a relatively larger diameter where the inlet tube and outlet tube are connected, and a relatively smaller diameter between where the inlet tube and outlet tube are connected to the metal tube; and
- the inlet tube and the outlet tube are connected to the supply of water and a water outlet respectively with adaptors, each adaptor having a seal formed between the adaptor and the inlet tube or outlet tube.

12. The method of claim 11 further comprising pumping water through the oil gallery core while the liquid aluminum is introduced into the mold.

13. The method of claim 11 wherein the liquid aluminum is introduced quiescently into the mold.

14. The method of claim 11 further comprising applying high pressure to the liquid aluminum in the mold after filling the mold with the liquid aluminum.

15. The method of claim 14 wherein the high pressure is applied until the liquid aluminum is solidified.

16. The method of claim 11 wherein the metal tube is made of aluminum or copper.

17. The method of claim 11 wherein the metal tube is made of a two layer structure.

18. The method of claim 17 wherein the two layer structure comprises an aluminum outer layer and a copper inner layer.

19. The method of claim 11 wherein the metal tube further comprises a deflector where the inlet tube and outlet tube are connected.

20. A method of making an aluminum piston without the use of a dissolvable salt core, the method comprising:

placing an oil gallery core in a mold;

introducing liquid aluminum into the mold around the oil gallery core such that no dissolvable salt core is present in the mold; and allowing the liquid aluminum to solidify, the oil gallery core forming a channel in the piston, wherein:

the oil gallery core comprises a metal tube connected to a hollow inlet tube and a hollow outlet tube;

the metal tube comprises a deflector where the inlet tube and outlet tube are connected;

the metal tube comprises a variable cross-section along substantially the entire length of the metal tube such that the metal tube has a relatively larger diameter where the inlet tube and outlet tube are connected, and a relatively smaller diameter between where the inlet tube and outlet tube are connected to the metal tube; and the inlet tube and the outlet tube are connected to a supply of water and a water outlet respectively with adaptors, each adaptor having a seal formed between the adaptor and the inlet tube or outlet tube.

* * * * *